US006997600B2

(12) United States Patent
Landers

(10) Patent No.: US 6,997,600 B2
(45) Date of Patent: Feb. 14, 2006

(54) INTERMITTENT AGITATION OF PARTICULAR MATTER

(75) Inventor: Alan Edward Landers, Suwanee, GA (US)

(73) Assignee: Process Control Corporation, Atlanta, GA (US)

( * ) Notice: Subject to any disclaimer, the term of this patent is extended or adjusted under 35 U.S.C. 154(b) by 209 days.

(21) Appl. No.: 10/683,766

(22) Filed: Oct. 10, 2003

(65) Prior Publication Data

US 2005/0078550 A1 Apr. 14, 2005

(51) Int. Cl.
*B01F 15/02* (2006.01)

(52) U.S. Cl. ........................ 366/194; 366/601; 222/63; 222/238

(58) Field of Classification Search .. 366/155.1–158.4, 366/64–67, 206, 279, 348, 601, 194, 195; 222/63, 238

See application file for complete search history.

(56) References Cited

U.S. PATENT DOCUMENTS

| | | | | |
|---|---|---|---|---|
| 3,548,280 | A * | 12/1970 | Cockroft | 318/443 |
| 4,958,741 | A | 9/1990 | Johanson | 220/83 |
| 5,071,289 | A | 12/1991 | Spivak | 406/11 |
| 5,524,796 | A | 6/1996 | Hyer | 222/77 |
| 6,055,781 | A | 5/2000 | Johanson | 52/197 |
| 6,059,149 | A | 5/2000 | Kanzler et al. | |
| 6,758,590 | B1 * | 7/2004 | Black | 366/64 |
| 2005/0121469 | A1 * | 6/2005 | Landers et al. | 222/185.1 |

FOREIGN PATENT DOCUMENTS

| | | |
|---|---|---|
| EP | 0 201 777 | 11/1986 |
| GB | 2 020 635 | 11/1979 |

* cited by examiner

*Primary Examiner*—David Sorkin
(74) *Attorney, Agent, or Firm*—Thomas, Kayden, Horstemeyer & Risley LLP; Todd Deveau

(57) ABSTRACT

Example embodiments of the present invention include systems and methods for intermittent agitation of particulate matter. In some embodiments, a mechanical agitator is intermittently activated within in a particulate-matter-delivery system.

7 Claims, 6 Drawing Sheets

INTERMITTENT AGITATION OF PARTICULAR MATTER

FIELD OF THE INVENTION

The present disclosure relates generally to delivery of particulate matter and, more particularly, to systems and methods for intermittent agitation of particulate matter in particulate-matter-delivery systems.

BACKGROUND

Mechanical agitators or stirring devices are commonly employed in hoppers to promote uniform and controlled distribution of particulate matter, such as powder or pellets, within the hopper. Typically, the mechanical agitators continuously stir the contents of the hopper at either a fixed rate or a variable rate to prevent clumping or packing of the particulate matter, thereby promoting the flow of the particulate matter out of the hopper. Other systems use pneumatic vibrators or streams of air to impart vibratory motion to a hopper, thereby deterring the formation of "bridges" or "rat holes" that would impede further movement of the material from the hopper. In addition to these approaches, pulsating air may be used for vibrating a conveyer that transports a particulate material.

Often, particulate delivery systems also include metering mechanisms for measuring and regulating the delivery rate of the particulate materials. Unfortunately, when these systems operate at slow feed rates, the metering mechanisms become more sensitive to vibratory motions. Thus, when used in conjunction with mechanical agitators, the vibrations caused by the mechanical agitators sometimes affect the measurements of the metering mechanisms. In view of this deficiency, a need exists in the industry.

SUMMARY

Exemplary embodiments of the present invention include systems and methods for intermittent agitation of particulate matter. In some embodiments, a mechanical agitator is intermittently activated within in a particulate-matter-delivery system.

Other systems, devices, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
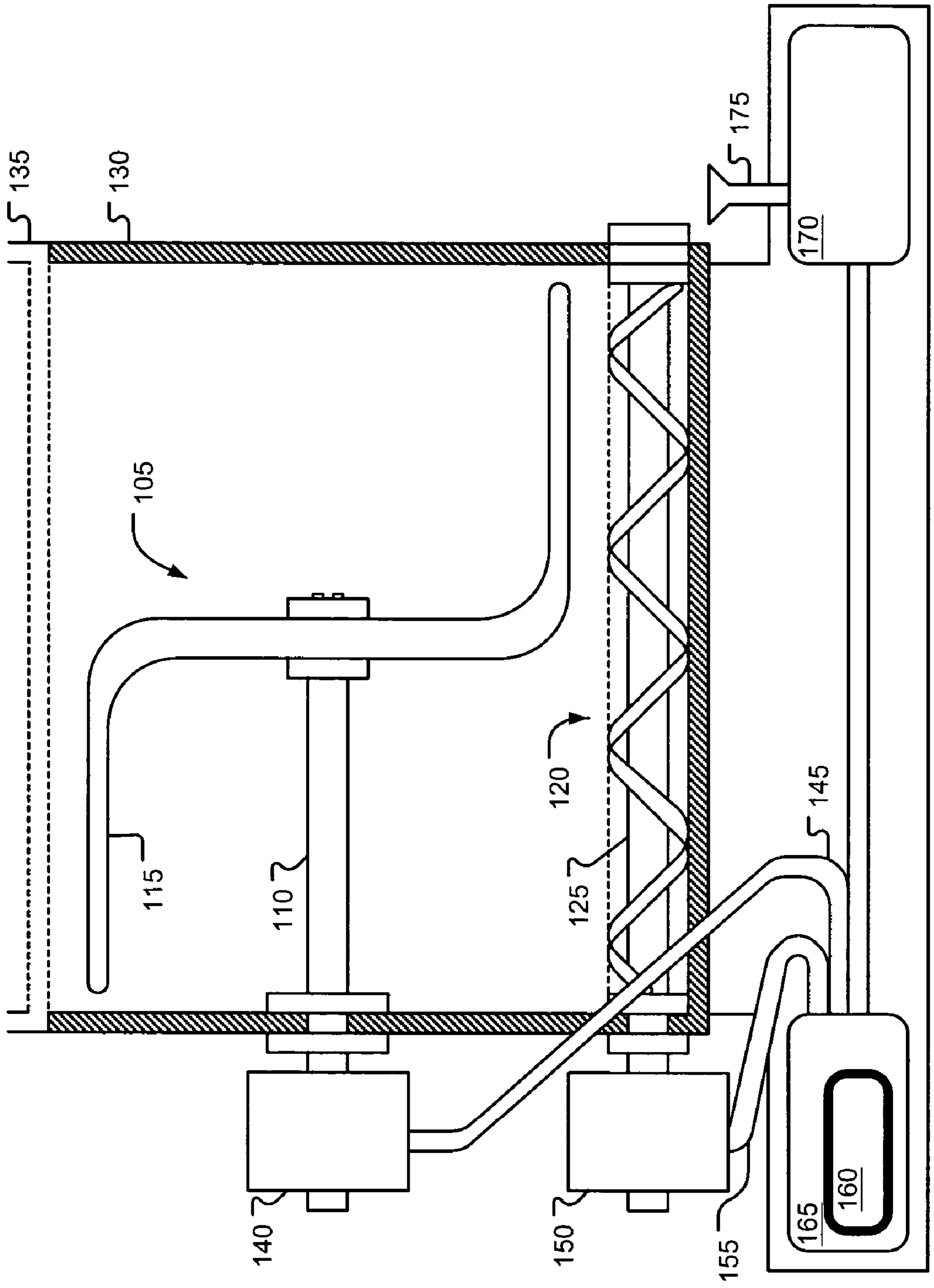
FIG. 1 is a block diagram showing an embodiment of a particulate-matter-delivery system that intermittently agitates particulate matter within a feeder.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Figure 2:
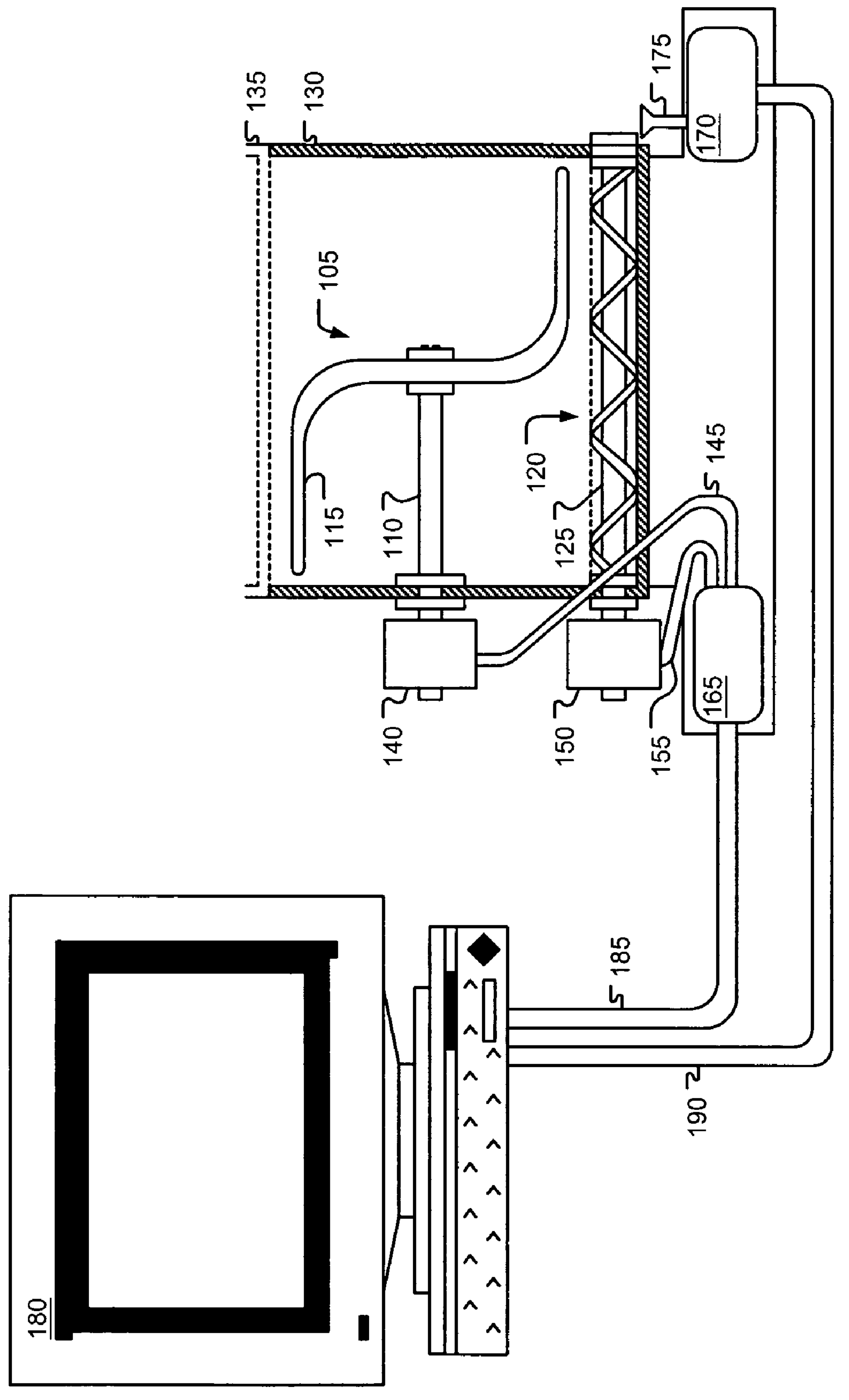
FIG. 2 is a block diagram showing another embodiment of a particulate-matter-delivery system that intermittently agitates particulate matter within a feeder.
Figure 3:
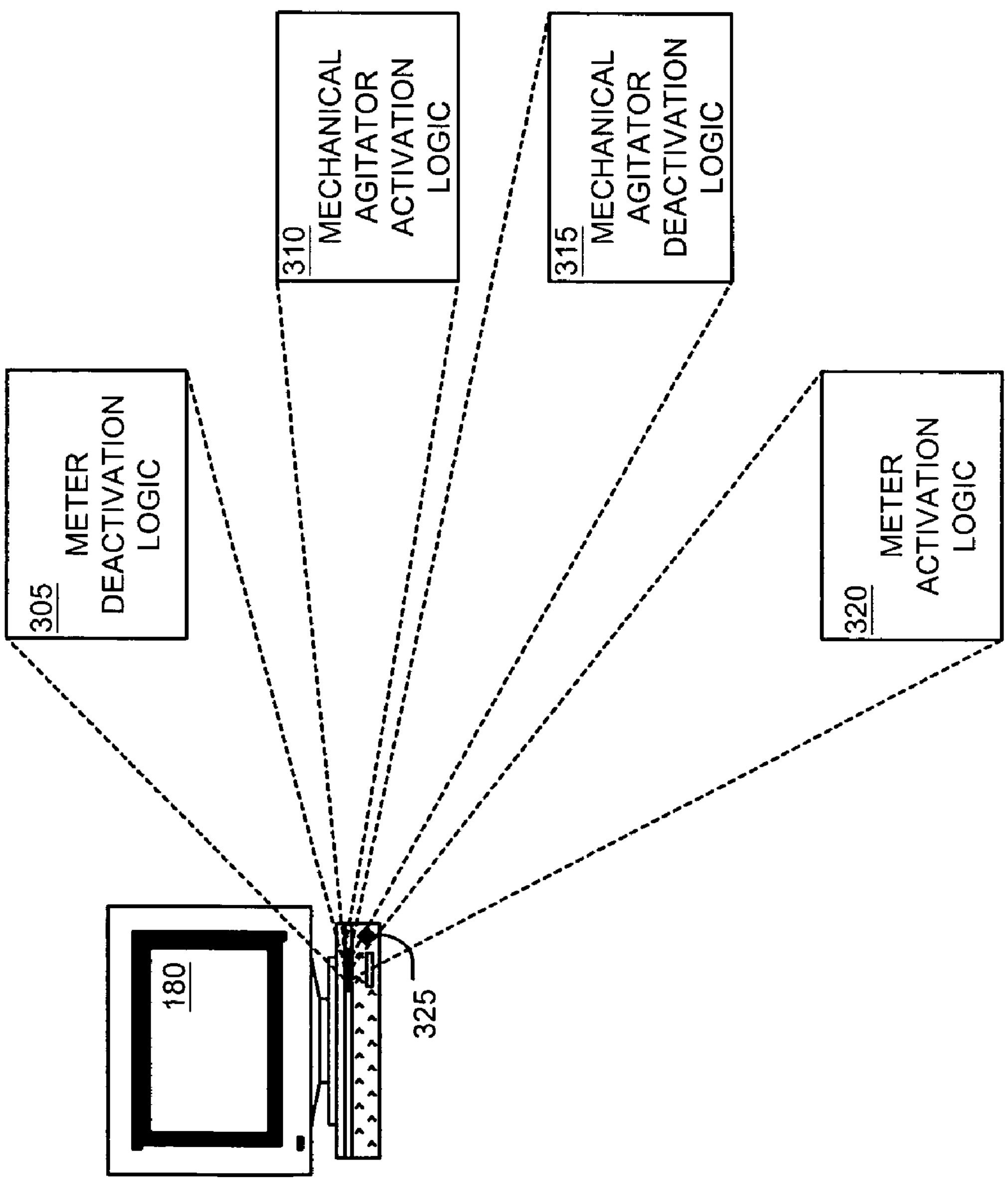
FIG. 3 is a block diagram showing an embodiment of a software timing mechanism that controls the intermittent agitation of the particulate matter in FIG. 2.
Figure 4A:
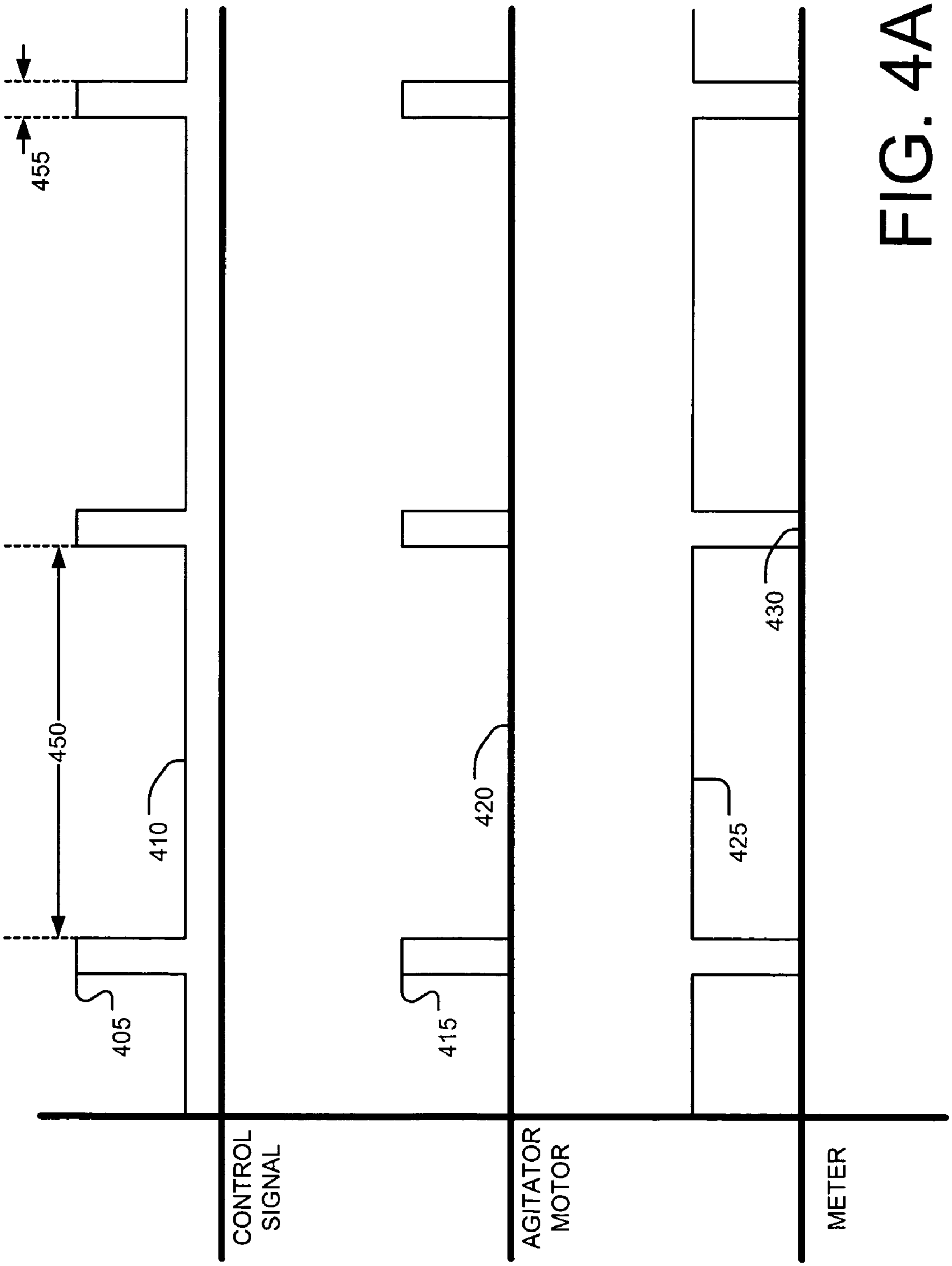
FIG. 4A is a timing diagram showing an embodiment of the timing associated with the system of FIGS. 1 and 2.
Figure 4B:
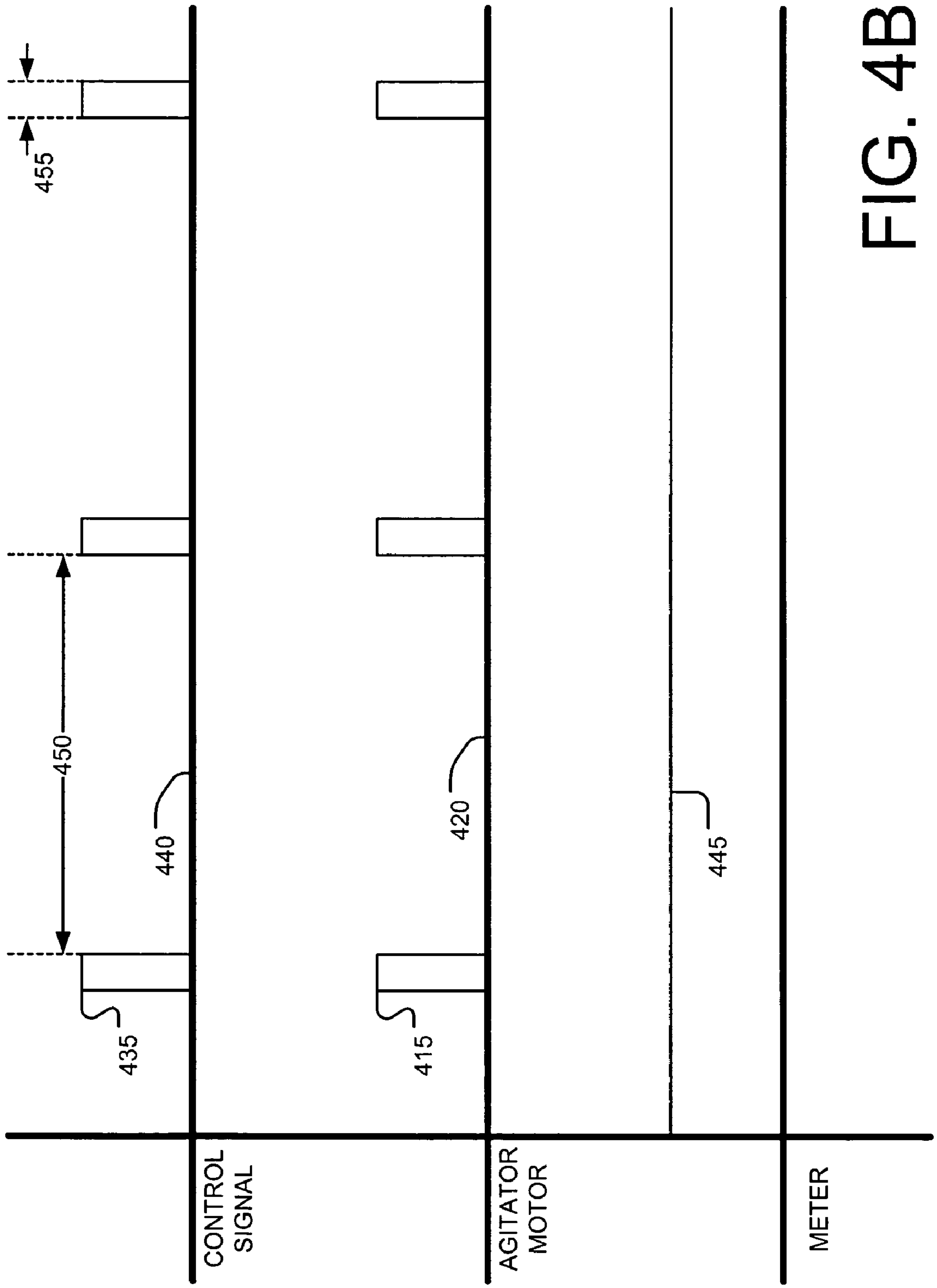
FIG. 4B is a timing diagram showing another embodiment of the timing associated with the system of FIGS. 1 and 2.
Figure 6:
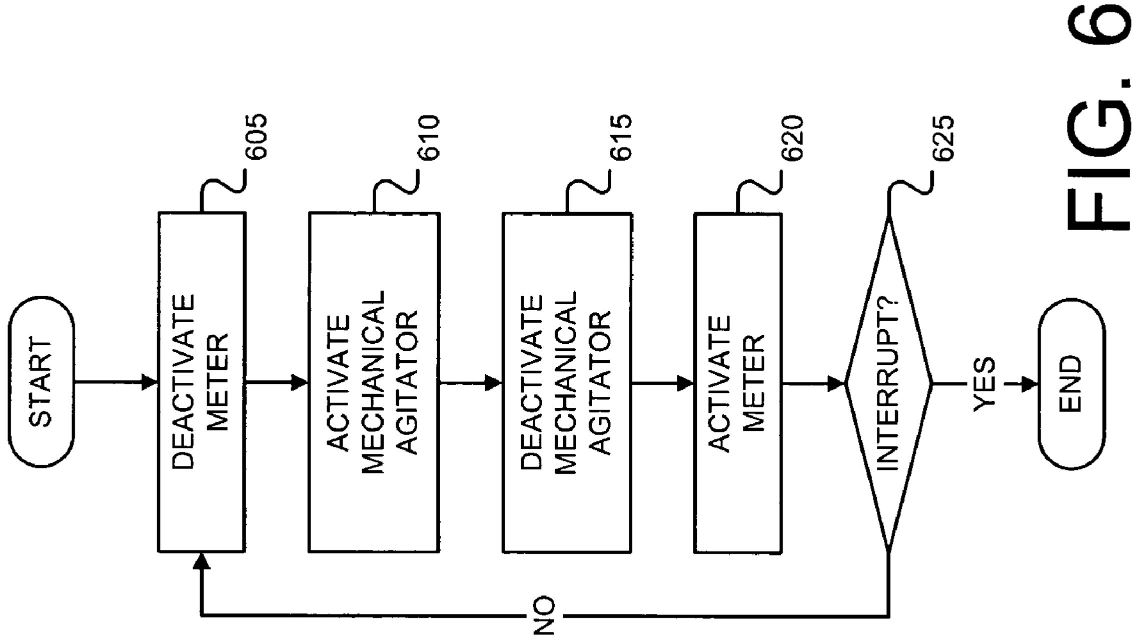
FIG. 6 is a flowchart showing another embodiment of a method for intermittently agitating particulate matter in a particulate-matter-delivery system.
Figure 5:
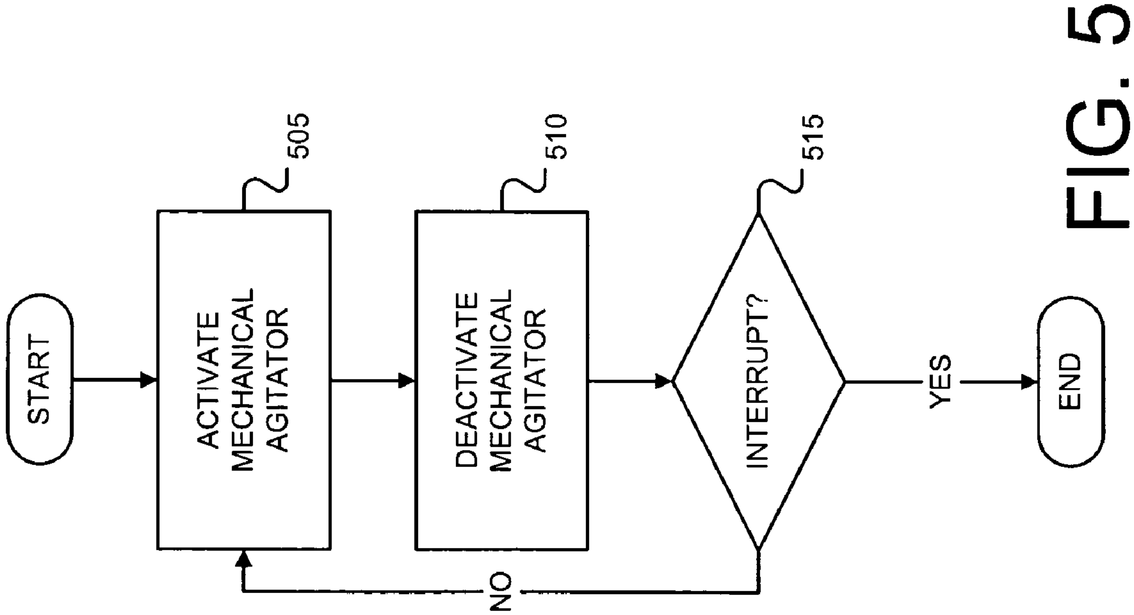
FIG. 5 is a flowchart showing an embodiment of a method for intermittently agitating particulate matter in a particulate-matter-delivery system.

Several embodiments of the present invention provide for intermittent activation and deactivation of a mechanical agitator in a particulate-matter-delivery system. When compared to traditional particulate-matter-delivery systems, which employ continuous agitation or variable-rate agitation, the intermittent agitation of the particulate matter results in a conservation of energy due to the periods of inactivity of the mechanical agitator. Additionally, the intermittent agitation facilitates reduction of adverse effects (e.g., vibrations or other artifacts) on other portions of the system (e.g., metering mechanisms within the system for monitoring output). In this regard, the delivery of the particulate matter may be more precisely metered. FIGS. 1 through 3 show embodiments of systems for intermittently agitating particulate matter within a feeder. FIGS. 4A and 4B show embodiments of timing diagrams related to the activation and deactivation of a mechanical agitator and a meter. FIGS. 5 and 6 show embodiments of processes for intermittently agitating particulate matter.

FIG. 1 is a block diagram showing an embodiment of a particulate-matter-delivery system that intermittently agitates particulate matter within a feeder 130. As shown in FIG. 1, in some embodiments, the particulate-matter-delivery system comprises a storage hopper 135 coupled to a feeder 130. The storage hopper 135 holds particulate matter (e.g., powder, pellets, etc.) and delivers the particulate matter to the feeder 130.

Often, an auger 120 is located within the feeder 130. The auger 120 is configured to rotate about an auger rotational axis 125. The rotation of the auger 120 results in expulsion of the particulate matter from the feeder 130. The auger 120 is mechanically coupled to an auger motor 150. Thus, when the auger motor 150 is activated, the auger motor 150 drives the rotation of the auger 120. The auger motor 150 is coupled to a power source 165, which supplies power to the auger motor 150 via an electrical coupling 155.

In some embodiments, the system comprises a sensor 175 that detects the output of the particulate matter from the feeder 130. The sensor 175 is coupled to a meter 170, which determines the output rate of the particulate matter from the feeder 130. The meter 170, when coupled to the power supply 165, may be used to control the output rate of the particulate matter from the feeder 130. Since feedback control mechanisms for controlling output rates are known to those having ordinary skill in the art, further discussion of the feedback control mechanism is omitted here.

A mechanical agitator 105 is located with in the feeder 130. In some embodiments, the mechanical agitator 105 comprises one or more blades 115 that interact with the particulate matter during agitation. The mechanical agitator 105 comprises an agitator rotational axis 110. The rotation of the mechanical agitator 105 about the agitator rotational axis 110 results in the mixing of the particulate matter within the feeder, thereby preventing packing or clumping of the particulate matter. The mechanical agitator 105 is mechanically coupled to an agitator motor 140. Thus, the agitator motor 140 drives the rotational motion of the blades 115 about the agitator rotational axis 110. Similar to the auger motor 150, the agitator motor 140 is coupled to the power source 165, which supplies power to the agitator motor 140 via an electrical coupling 145. Because the power supply 165 provides power to both the agitator motor 140 and the auger motor 150, it should be appreciated that the power from the power supply 165 can be divided and independently controlled for the agitator motor 140 and the auger motor 150. Since techniques for dividing power and independently delivering power to multiple devices from a single source are known in the art, further discussion of such mechanisms is omitted here.

In some embodiments, the particulate-matter-delivery system includes a hardware controller 160. The hardware controller 160 is coupled to the power source 165 and can be configured to control the delivery of power from the power source 165 to the agitator motor 140. In some embodiments, the hardware controller 160 is configured to intermittently produce an electrical signal. The intermittent production of the electrical signal results in an intermittent delivery of power from the power supply 165 to the agitator motor 140. The intermittent delivery of power results in the agitator motor 140 being driven intermittently. Since the mechanical agitator 105 is mechanically coupled to the agitator motor 140, the intermittent behavior of the agitator motor 140 results in a corresponding intermittent rotation of the mechanical agitator 105 about the agitator rotational axis 110.

In some embodiments, the hardware controller 160 can also be electrically coupled to the meter 170. In this regard, the hardware controller 160 can be configured to deactivate the meter 170 when the agitator motor 140 is activated. Conversely, the hardware controller 160 may be configured to activate the meter 170 when the agitator motor 140 is deactivated. Thus, any vibration generated from the movement of the mechanical agitator 105 is effectively removed during operation of the meter 170. In other words, vibrational artifacts generated by the mechanical agitator 105 are effectively minimized during the measurement of particulate output from the feeder 130. In order to maximize the monitoring of the output, the activation of the mechanical agitator 105 can occupy a small portion of the duty cycle. For example, in some embodiments, the period of activation may be twenty percent (20%) of the total operating period while the period of deactivation can be eighty percent (80%) of the total operating period. Some embodiments of the timing diagram for the activation and deactivation of the meter 170 and the mechanical agitator 105 are shown with reference to FIGS. 4A and 4B.

The hardware controller 160 can be implemented using conventional timing circuits, such as, for example, phase-locked loops. Since conventional timing circuits are known in the art, further discussion of timing circuits is omitted here. However, it should be appreciated that the intermittent agitation of the particulate matter conserves energy due to the periods of deactivation, in which the agitator motor 140 consumes minimal or no power. Also, unlike continuous-agitation or variable-rate-agitation systems, the deactivation of the mechanical agitator for a finite time interval facilitates the reduction of adverse effects (e.g., vibration or other artifacts) on other portions of the system.

FIG. 2 is a block diagram showing another embodiment of a particulate-matter-delivery system that intermittently agitates particulate matter within a feeder. Similar to FIG. 1, the particulate-matter-delivery system of FIG. 2 comprises a storage hopper 135, a feeder 130, a mechanical agitator 105, an auger 120, an agitator motor 140, an auger motor 150, a sensor 175, a meter 170, and a power supply 165. Since these components have been discussed in great detail with reference to FIG. 1, further discussion of these components is omitted here.

Unlike FIG. 1, however, the power supply 165 and the meter 170 are electrically coupled to a software controller 180. The coupling 185, 190 permits control of the power supply 165 and the meter 170 by the software controller 180. In some embodiments, the software controller 180 comprises an ordered listing of executable instructions for implementing logical functions. Various embodiments of logical functions associated with both the software controller 180 and hardware controller 160 are described with reference to the flowcharts of FIGS. 5 and 6.

The software controller 180 can be configured to activate the agitator motor 140, thereby activating the mechanical agitator 105. Substantially concurrently, the software controller 180 may deactivate the meter 170. Similarly, the software controller 180 can be configured to deactivate the mechanical agitator 105 substantially concurrently with the activation of the meter 170. The substantially concurrent activation and deactivation of the meter 170 and the mechanical agitator 105 results in an effective decoupling of the effects of the mechanical agitator 105 from the measurement of the output at the feeder 130. Some embodiments of the timing diagram for the activation and deactivation of the meter 170 and the mechanical agitator 105 are shown with reference to FIGS. 4A and 4B.

It should be appreciated that the software controller 180 can be embodied in any computer-readable medium for use by, or in connection with, an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

FIG. 3 is a block diagram showing an embodiment of a software timing mechanism that controls the intermittent agitation of the particulate matter in FIG. 2. Specifically, FIG. 3 shows, in greater detail, the software controller 180 of FIG. 2. As shown in FIG. 3, the software controller 180 comprises meter-deactivation logic 305, mechanical-agitator-activation logic 310, mechanical-agitator-deactivation logic 315, and meter-activation logic 320.

The meter-deactivation logic 305 is configured to deactivate the meter 170. In this regard, the meter-deactivation logic 305 can include logic components that convey a deactivation signal to the meter 170. Similarly, the mechanical-agitator-deactivation logic 315 can include logic components that convey a deactivation signal to the section of the power supply 165 that supplies the power to the agitator motor 140. The deactivation signal from the mechanical-agitator-deactivation logic 315 deactivates the mechanical agitator 105. Conversely, the mechanical-agitator-activation logic 310 can include logic components that convey an activation signal to the section of the power supply 165 that supplies power to the agitator motor 140, thereby reactivating the mechanical agitator 105. Similarly, the meter-activation logic 320 can include logic components that convey an activation signal to the meter 170, thereby reactivating the meter 170.

The meter-deactivation logic 305, mechanical-agitator-activation logic 310, mechanical-agitator-deactivation logic 315, and meter-activation logic 320 can be implemented in hardware, software, firmware, or a combination thereof. In the preferred embodiment(s), the meter-deactivation logic 305, mechanical-agitator-activation logic 310, mechanical-agitator-deactivation logic 315, and meter-activation logic 320 are implemented in software or firmware that is stored in a memory and that is executed by a suitable instruction execution system.

In an alternative embodiment, the meter-deactivation logic 305, mechanical-agitator-activation logic 310, mechanical-agitator-deactivation logic 315, and meter-activation logic 320 are implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. Since the programming of logic components is known in the art, further discussion of the software controller 180 and its various logic components is omitted here.

In addition to these logical components, the software controller 180 can be shut down by an on/off switch 325 located on the programmable device that houses the software controller 180. As shown in FIG. 3, the software controller 180 can be configured to perform substantially the same functions as the hardware controller 160 of FIG. 2. In this regard, the vibrational effects of the mechanical agitator 105 can be decoupled from the output measurements by the sensor 175 and the meter 170.

FIG. 4A is a timing diagram showing an embodiment of the timing associated with the system of FIGS. 1 and 2. Specifically, FIG. 4A shows timing for a control signal, the agitator motor 140, and the meter 170. The control signal represents the signal generated from either the hardware controller 160 or the software controller 180. As shown in FIG. 4A, the control signal has an activation level 405 and a deactivation level 410. In some embodiments, the activation level 405 and deactivation level 410 can represent two different voltage levels. The activation level 405 represents a signal amplitude when the software controller 180 (or hardware controller 160) outputs an activation signal. Conversely, the deactivation level 410 represents a signal amplitude when the controller 160, 180 outputs a deactivation signal. As seen in FIG. 4A, the time interval 455 for the activation signal is shorter than the time interval 450 for the deactivation signal.

As shown in FIG. 4A, the timing for the agitator motor 140 substantially mimics the timing for the control signal. It should be appreciated that, in the embodiment of FIG. 4A, the agitator motor is deactivated in the absence of the deactivation signal. Thus, unlike variable-rate agitation systems found in the prior art, the mechanical agitator 105 in the embodiment of FIG. 4A is disabled during the deactivation period.

As shown in FIG. 4A, the timing for the meter 170 is substantially the inverse of the timing for the agitator motor 140. In this regard, when the agitator motor 140 is activated, the meter 170 is deactivated, and vice versa. While FIG. 4A shows the on-off period of the meter 170 having a 1:1 correspondence with the off-on period of the agitator motor 140, it should be appreciated that the meter 170 can be activated during a portion of the deactivation period 450 for the agitator motor 140. In other words, the meter 170 need not be active during the entire deactivation period 450 of the agitator motor 140.

As shown in FIG. 4A, by providing a shorter activation period 455 than a deactivation period 450, minimal temporal disruptions are introduced into the particulate-matter-delivery system by the mechanical agitator 105.

FIG. 4B is a timing diagram showing another embodiment of the timing associated with the system of FIGS. 1 and 2. FIG. 4B shows an embodiment where the deactivation power level 440 is zero (0) volts. In other words, rather than fluctuating between two different voltage levels, the control signal, in the embodiment of FIG. 4B, fluctuates between one voltage level and "off." Also, unlike FIG. 4A, rather than deactivating the meter 170 during the activation period, the meter 170 is continually operated during both the activation and deactivation of the agitator motor 140. While the embodiment of FIG. 4B may be more susceptible to vibrational effects during the activation period, it should be appreciated that the vibrational effects can be reduced by appropriately adjusting the timing of the control signal and the agitator motor 140.

FIG. 5 is a flowchart showing an embodiment of a method for intermittently agitating particulate matter in a particulate-matter-delivery system. As shown in FIG. 5, some embodiments of the method comprise the steps of recursively activating (505) and deactivating (510) a mechanical agitator in the absence of an interrupt (515). In other words, during normal operation, the mechanical agitator is sequentially activated (505) and deactivated (510) until the normal operation is interrupted. In some embodiments, the interrupt (515) may be either a temporary or a permanent shutdown of the particulate-matter-delivery system. In a preferred embodiment, the period of activation is shorter than the period of deactivation, thereby minimizing disruptions to other parts of the system (e.g., metering mechanisms, etc.) while the mechanical agitator is activated. For some embodiments, the period of activation may be no greater than approximately twenty percent (20%) of the duty cycle, and the period of deactivation may be no greater than approximately eighty percent (80%) of the duty cycle. Preferably, the activation period is on the order of seconds (e.g., three (3) seconds, five (5) seconds, ten (10) seconds, twelve (12) seconds, etc.) while the period of deactivation is on the order of minutes (e.g., five (5) minutes, ten (10) minutes, sixteen (16) minutes, etc.). Thus, the mechanical agitator is activated at appropriate time intervals to prevent packing or clumping of the particulate matter. Additionally, the mechanical agitator is deactivated during the balance of the normal operation in order to minimize disruptions within the particulate-matter-delivery system.

FIG. 6 is a flowchart showing another embodiment of a method for intermittently agitating particulate matter in a particulate-matter-delivery system. As shown in FIG. 6, some embodiments of the process comprise the steps of deactivating (605) a meter prior to activating (610) a mechanical agitator. Thus, when the mechanical agitator is activated (610), the meter is deactivated (605), thereby minimizing any artifact from the mechanical agitator that may influence the metering of the particulate matter deliver. After agitation, the mechanical agitator is deactivated (615). Upon deactivating (615) the mechanical agitator, the meter is activated (620). The process recursively repeats until it is interrupted (625). Again, the interrupt (625) may be a temporary or permanent shutdown of the process.

As shown in the process of FIGS. 5 and 6, intermittently agitating the particulate matter, rather than continuously agitating the particulate matter, conserves energy. Also, unlike continuous agitation or variable-rate agitation, the deactivation of the mechanical agitator for a finite time interval facilitates the reduction of adverse effects (e.g., vibration or other artifacts) on other portions of the system.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although exemplary embodiments have been shown and described, it will be clear to those of ordinary skill in the art that a number of changes, modifications, or alterations to the invention as described may be made. For example, while a specific configuration for the particulate-matter-delivery system is shown in FIGS. 1 and 2, it should be appreciated that the intermittent agitation may be applied to other particulate-matter-delivery systems. Additionally, while particular duty cycles are provided in several embodiments, it should be appreciated that the timing may be varied to provide optimal activation and deactivation periods for the mechanical agitator 105. All such changes, modifications, and alterations should therefore be seen as within the scope of the disclosure.

What is claimed is:

1. In a particulate-matter-delivery system having a mechanical agitator and a meter for monitoring the delivery of particulate matter from the system, a method comprising the steps of:

activating the mechanical agitator;

deactivating the mechanical agitator;

recursively repeating the mechanical agitator activating and deactivating steps; and deactivating the meter when the mechanical agitator is activated.

2. The method of claim 1:

wherein the step of activating the mechanical agitator comprises the step of activating the mechanical agitator during a first time interval; and wherein the step of deactivating the mechanical agitator comprises the step of deactivating the mechanical agitator during a second time interval, the second time interval being greater than the first time interval.

3. The method of claim 2:

wherein the step of activating the mechanical agitator during the first time interval comprises the step of activating the mechanical agitator for approximately ten (10) seconds; and wherein the step of deactivating the mechanical agitator during the second time interval comprises the step of deactivating the mechanical agitator for approximately five (5) minutes.

4. The method of claim 2:

wherein the step of activating the mechanical agitator during the first time interval comprises the step of activating the mechanical agitator for less than approximately twenty percent (20%) of a duty cycle; and wherein the step of deactivating the mechanical agitator during the second time interval comprises the step of deactivating the mechanical agitator for more than approximately eighty percent (80%) of the duty cycle.

5. The method of claim 1, further comprising the steps of:

activating the meter to monitor the delivery of an output of the particulate matter from the system when the mechanical agitator is deactivated.

6. The method of claim 1, further controlling the activation and deactivation of the mechanical agitator and the meter by a logic controller.

7. The method of claim 6, wherein the logic controller is a phase-locked loop circuit.

* * * * *